May 28, 1929.  J M. JONES  1,714,912
CARBIDE LAMP
Original Filed Oct. 6, 1925  2 Sheets-Sheet 2
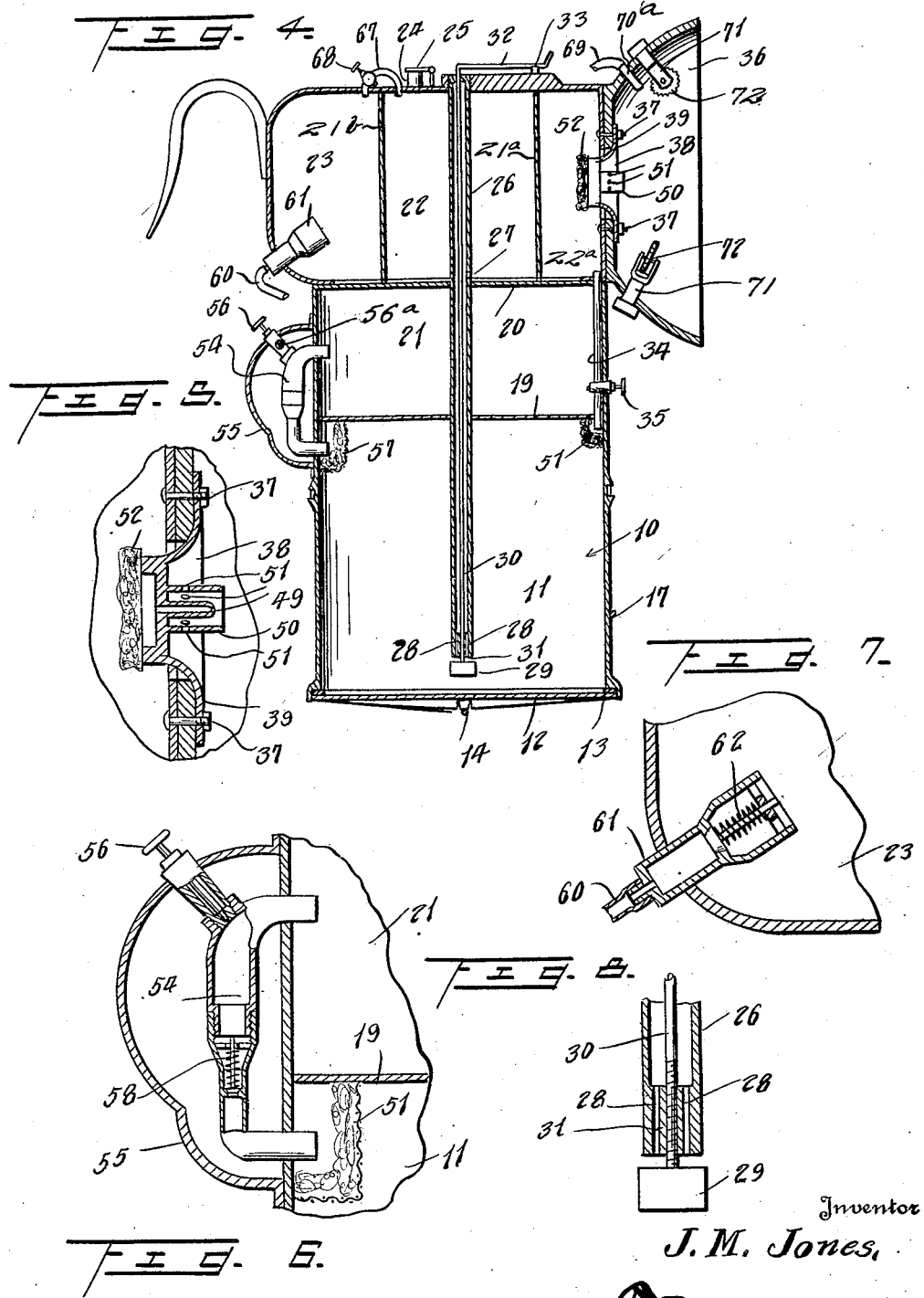
Inventor
J. M. Jones, Patented May 28, 1929.

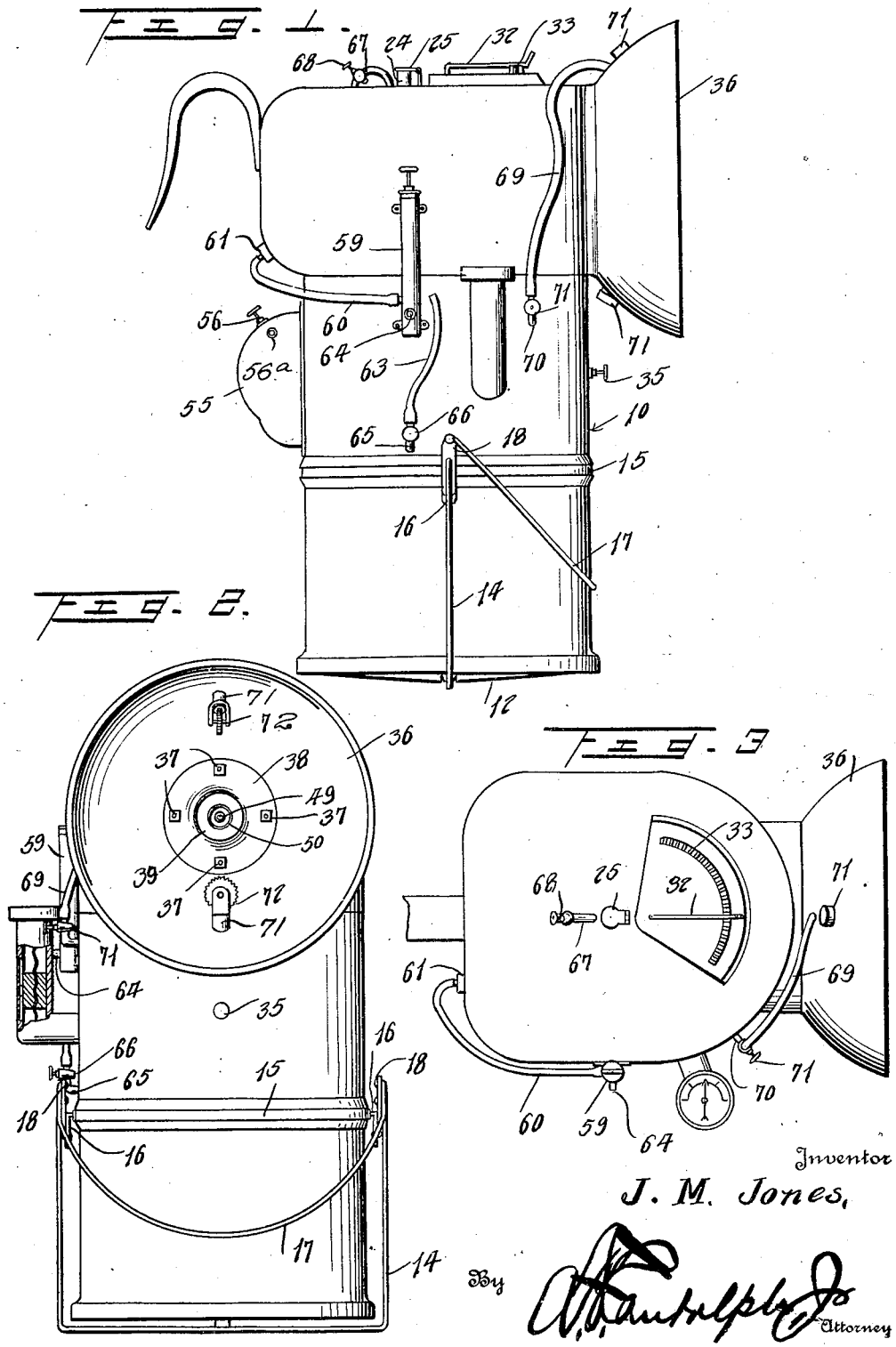

1,714,912

UNITED STATES PATENT OFFICE.

JAMES M. JONES, OF MANCHESTER, KENTUCKY.

CARBIDE LAMP.

Application filed October 6, 1925, Serial No. 60,829. Renewed October 6, 1928.

This invention relates to a carbide lamp.

It is aimed to provide a novel construction wherein the lamp may be maintained lighted while spent carbide is removed therefrom or while parts of the burner are being cleaned or inspected.

Another object of the invention is to provide a pressure means in connection with the different chambers so as to place the generated gas under pressure.

The more specific objects and advantages will become apparent from a consideration of the description following taken in connection with the accompanying drawings illustrating an operative embodiment.

In said drawings:

Figure 1 is a view of the lamp in side elevation;

Figure 2 is a view of the lamp in front elevation;

Figure 3 is a plan view of the lamp;

Figure 4 is a central vertical section through the lamp;

Figure 5 is a detail enlarged sectional view through the burner;

Figure 6 is an enlarged sectional view partly broken away, illustrating the communication between the carbide chamber and auxiliary gas storage chamber;

Figure 7 is a sectional view of the compressed air inlet valve of the air chamber, and Figure 8 is a detail sectional view of the water outlet connection.

Referring specifically to the drawings, a closed reservoir or lamp body is provided as at 10, having a chamber 11 therein to carry calcium carbide for use in connection with water to generate gas. The bottom of this chamber is shown at 12 and is removable, being held hermetically in place against a gasket 13 by means of a suitable retainer, comprising, as best seen in Figures 1 and 2, a U-shaped rod 14, having its terminals disposed at the sides of the body 10 and fastened to a groove 15 about the same by means of resilient fingers 16 adapted to fit thereinto. Element 14 is carried by a bail 17 pivoted thereto as at 18. At the top of the carbide chamber 11 is a transverse wall or partition 19 and spaced above the same is a transverse wall or partition 20 whereby an auxiliary gas storage chamber 21 is afforded. Above the chamber 21, the body is formed into three chambers by transverse vertical partitions 21$^a$ and 21$^b$ so as to have an intermediate water chamber 22, a gas chamber 22$^a$ and a main air supply chamber 23. Water may be supplied to the chamber 22 through a filling tube 24 normally closed by a cover 25. Disposed in the water chamber and extending therefrom through the chamber 21 and into the chamber 11 is a water feed tube 26 having a port 27 within the chamber 22 so that the water may flow therethrough. At the lower end, the tube 26 has outlet orifices 28 through which the water is adapted to pass in drops and which orifices may be opened or closed by means of a valve 29 carried by a rod 30 screw threaded at 31 in the lower end of the tube and operable by a crank 32 from the top of the lamp and which is resilient and coacts with a notched ring or rack 33 to hold the handle in different adjusted positions. It will be realized that when the handle is turned, it will be elevated or lowered according to the direction of turning to correspondingly elevate or lower the valve 29 to open or close the ports or orifices 28 completely or to any desired degree.

The water dropping through the passages 28 onto the calcium carbide in chamber 11 generates a gas in the well known manner and this gas passes from chamber 11 through a tube 34 to the chamber 22$^a$, under control of the valve 35.

A reflector 36 is removably bolted as at 37 to the body 10, which bolts also secure in place a suitable burner tip 38 which has a flange 39 through which said bolts pass. The burner also has an outlet nipple 49 through which the gas from chamber 22$^a$ passes, which nipple is surrounded by a short tube 50 extending outwardly beyond the same and having orifices 51 adjacent the inner end thereof for the intake of air to supply the necessary oxygen for proper operation of the burner. Suitable gauze or the like may be enclosed at 52 to remove solid matter from the gas passing through the burner.

The gas from the chamber 11 may enter the auxiliary storage chamber 21 through a pipe 54 which communicates with both chambers and which is preferably covered by a shield 55, a valve for said pipe, 56, being operable from the exterior of the shield. Suitable gauze or the like is provided at 57 adjacent the entrance to both pipes 34 and 54 in order that solid matter or foreign matter cannot enter the pipe with the gas. The purpose of the chamber 21 is for storage of a quantity of gas to be utilized by the burner while the carbide chamber 11 is being loaded. Pipe 54 has a safety valve 58 therein as best shown in Figure 6, so that gas cannot pass backwardly from chamber 21 to chamber 11. Fastened to the outside of the reservoir 10 is a hand operable pump 59 which has a hose connection 60 that is adapted to be connected so as to be in communication with the interior of chamber 23 through a nozzle 61 as detailed in Figure 7, said nozzle having a valve 62 therein normally urged to its seat and adapted to prevent back pressure from chamber 23 into the pipe 60. A flexible hose connection 63 is provided which may be connected to a nipple on the pump at 64 and which hose communicates with a nipple 65 under control of a cut-off valve 66, such nipple communicating with the interior of chamber 11. At the same time pipe 60 is disconnected from nozzle 61 and connected with a nipple 56ª communicating with valve 56 that is closed when the pressure of the gas in chamber 21 is sufficient, said pressure being created by operation of the pump 59 with the pipes 60 and 63 connected as stated. The air pressure chamber 23 will act on the water in chamber 22 since an arched pipe 67 leads from chamber 23 to chamber 22, having a control valve 68 therein.

From the chamber 21, a tube or pipe 69 leads, being connected to a nipple 70 communicating with said chamber, valve 71 controlling said pipe 69. 70ª is a burner tip connected with pipe 69, said burner being carried by the reflector 36. 71 indicates igniting devices of conventional type carrying flint or other spark producing material that is adapted to be engaged by the disks 72 having the usual abrasive peripheries, said ignition devices being arranged adjacent to the herein before described burners, as shown.

As before described the chamber 21 may be used to supply gas to the burner tip 70ª when it is desired to reload the carbide chamber 11 and, it may also be used should the burner structure 38 or the pipe 34 supplying it with gas become clogged or require inspection, or these parts become temporarily inoperative for any reason. It will also be understood that when pipe 63 is disconnected from the pump and pipe 60 connects the pump with nozzle 61, air may be compressed in chamber 23 to be supplied to water chamber 22, through pipe 67, under control of valve 68, to insure proper feed of water therefrom to the carbide chamber 11.

Various changes may be resorted to provided they fall within the spirit and scope of the invention.

What is claimed is:—

1. A lamp of the class described having a generating chamber, a gas chamber in communication therewith, a burner supplied by said gas chamber, an auxiliary gas storage chamber in communication with the generating chamber, burner means in communication with said storage chamber, said storage chamber being above the generating chamber, an air supply chamber being above the generating chamber, a water supply chamber communicating with the air supply chamber, an outlet tube leading from the water chamber through the storage chamber and into the generating chamber, and valve means to control the supply of water through said tube.

2. A lamp of the class described having a generating chamber, a gas chamber in communication therewith, a burner supplied by said gas chamber, an auxiliary gas storage chamber in communication with the generating chamber, burner means in communication with said storage chamber, an air storage chamber above the generating chamber, a water supply chamber communicating with the air supply chamber, an outlet tube leading from the water chamber through the storage chamber and into the generating chamber, valve means to control the supply of water through said tube, and pressure supply means operable for selective communication with the air chamber and the auxiliary gas storage chamber.

3. A lamp of the class described having a generating chamber, a gas chamber in communication therewith, a burner supplied by the gas chamber, an auxiliary gas chamber in communication with the generating chamber, a burner supplied by the auxiliary gas chamber, said burners being located relatively close together, water supplying means for the generating chamber, and means operable selectively to place the water in the water supplying chamber under pressure of the gas in the auxiliary chamber under pressure.

4. A lamp of the class described comprising a casing divided into three sections by horizontal partitions, the upper section being divided into three chambers by transverse vertical partitions, a lamp burner communicating with one of said chambers, means connecting said chamber with the lowermost section, another of said chambers adapted to contain water and communicating with the lowermost section, the third of said chambers being arranged to contain air under pressure and being in communication with the water chamber, the lowermost section being adapted to contain material for generating gas to supply the burner aforesaid, and the intermediate section being adapted to store gas and having valve controlled connection with the lowermost section.

In testimony whereof I affix my signature.

JAMES M. JONES.